United States Patent
Rooney et al.

[15] 3,670,230
[45] June 13, 1972

[54] ACTIVE FILTER CAPACITOR FOR POWER SUPPLY SWITCHING REGULATORS

[72] Inventors: James J. Rooney, Apalachin; Augustyn Z. Walach, Endicott, both of N.Y.

[73] Assignee: International Business Machines Corporation, Armonk, N.Y.

[22] Filed: Dec. 21, 1970

[21] Appl. No.: 100,110

[52] U.S. Cl. .................. 321/10, 323/8, 323/DIG. 1, 328/167, 328/263
[51] Int. Cl. ................................................ H02m 1/14
[58] Field of Search ................ 321/10; 323/8, 22 T, DIG. 1; 328/167, 263; 333/79

[56] References Cited

UNITED STATES PATENTS

| | | | |
|---|---|---|---|
| 2,892,164 | 6/1959 | Woll | 333/79 X |
| 2,221,198 | 11/1940 | Meinema | 323/8 |
| 2,981,895 | 4/1961 | Koch | 333/79 X |
| 3,374,425 | 3/1968 | Barditch et al. | 321/10 X |

OTHER PUBLICATIONS

H. J. Paz, "Transistorized Filter for DC Power Supply," RCA Technical Note No. 102, RCA Labs., Princeton, N.J., March 1958.

Primary Examiner—A. D. Pellinen
Attorney—Hanifin and Jancin

[57] ABSTRACT

An active filter capacitor circuit for DC voltage regulation in power supply systems with the active capacitor consisting of an amplifier and a transistor output stage driven by the amplifier.

9 Claims, 7 Drawing Figures

INVENTORS
JAMES J. ROONEY
AUGUSTYN Z. WALACH

BY *G. R. Gugger*

AGENT

ACTIVE FILTER CAPACITOR FOR POWER SUPPLY SWITCHING REGULATORS

BACKGROUND OF THE INVENTION

The present invention pertains to power supply circuits and more particularly to a phase control regulator power supply which provides the power to the load and regulates the load voltage. One of the components limiting the performance and raising the cost of high frequency, 400 Hz and above, switching regulators is filter capacitors. It was found that in phase control regulator power systems required to drive memory units and the like that the best available commercial high frequency capacitor did not possess the capability of providing the required performance. In order to achieve the desired results, it was necessary to use a substantial number of such capacitors in parallel. This not only has a detrimental affect on the reliability of the power system but since the passive capacitor is expensive the cost of the power system was greatly increased.

SUMMARY OF THE INVENTION

The present invention makes use of an inexpensive active circuit to replace the expensive passive filter capacitors. The circuit comprises an operational amplifier, a power transistor and a resistor-capacitor network which functions as an active capacitor and filter for DC voltage regulation in power supply systems. Any AC voltage appearing across the load is fed back to the operational amplifier input. The amplifier output voltage is a function of the input voltage and the gain of the stage which is controlled by the resistance-capacitance network. The amplifier output voltage is used to drive the transistor so that AC current flowing in the load will be diverted into the transistor. The capacitor circuit is a negative feedback circuit and the larger the AC output voltage, the harder the transistor is driven to reduce that voltage. Means are provided to bias the transistor with a DC current so that it can operate on a bi-directional AC current.

Another feature of the present circuit is its ability to improve the response of the power supply to a sudden change in load current. Upon a demand for increased load current, the operational amplifier and transistor function to divert the transistor bias current into the load until the power supply can increase its current to take care of the increased demand. There is provided, in effect, a current reservoir to take care of sudden current demands.

It is, then, a primary object of this invention to provide a novel and inexpensive active circuit for replacing passive filter capacitors.

A further object of the present invention is to provide an active filter capacitor circuit having improved performance characteristics over passive filter capacitors.

Another object of the present invention is to provide a circuit comprising an operational amplifier, a power transistor, and a resistor-capacitor network, which functions as an active capacitor and filter for DC voltage regulation in power supply systems.

A still further object of the present invention is to provide an active filter capacitor circuit for DC voltage regulation in power supply systems and having current reservoir means for improving the response of the power supply to sudden load current demands.

The foregoing and other objects, features and advantages of the invention will be apparent from the following more particular description of preferred embodiments of the invention as illustrated in the accompanying drawings.

DESCRIPTION OF PREFERRED EMBODIMENTS

Figure 1:
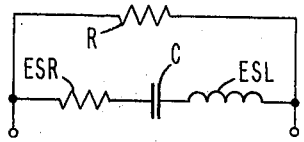
FIG. 1 shows the equivalent circuit of a passive capacitor.

Referring first to the capacitor equivalent circuit shown in FIG. 1, in order to build a 2V at 200 Amp, ± 3 percent regulator at least the following capacitor characteristics are required:

| | |
|---|---|
| C | .25 farads |
| ESR | 2 milliohms |
| ESL | 20 nanohenries |
| $R_{LEAK}$ | is relatively unimportant in power supply applications. |

ESR and ESL refer to the equivalent series resistance and inductance of the capacitor.

The best available commercial high frequency capacitor is a polarized capacitor having the following characteristics:

| | |
|---|---|
| C | .013 farads |
| ESR | 40 milliohms |
| ESL | 75 nanohenries |
| $R_{LEAK}$ | 1K ohm |

It can be seen that a quantity of 20 commercial type passive capacitors would have to be put in parallel to achieve the above-mentioned desired regulator. The capacitor cost of the circuit would be high and this would be even further increased if improved performance in the range of ± 2 percent or ± 1 percent were desired.

Figure 2:
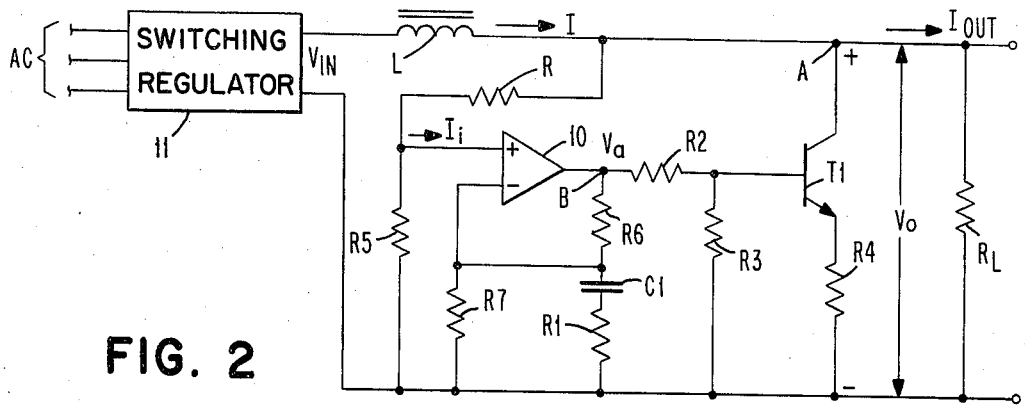
FIG. 2 is a schematic diagram of an embodiment of the active capacitor circuit according to the present invention, along with the inductance L that comprise a filter for the switching regulator.

Referring to FIG. 2, the active capacitor circuit of the present invention realizes a capacitor having far greater capabilities than presently available commercial capacitors. The circuit is constructed around an operational amplifier 10, an NPN power transistor T1 and a coupling capacitor C1 and it is shown embodied in a power supply system comprising an AC switching regulator 11 and a power inductor L which feed a load resistor $R_L$. Transistor T1 is connected across the power supply output with its emitter electrode being connected to a biasing resistor R4. The regulated output voltage $V_o$ which is applied to the load is developed between the collector electrode of the transistor and resistor R4. The base electrode of transistor T1 is coupled to the output of the operational amplifier by way of a divider network comprising the resistors R2 and R3. A feedback path for the output voltage $V_o$ is provided through a biasing resistor divider network R, R5 to the positive input terminal of the amplifier. The negative input terminal of the amplifier is connected to a biasing resistor R7 and also, in parallel with resistor R7, to a capacitor C1 and resistor R1 connected in series. A local feedback resistor R6 for the operational amplifier is connected between the output of the amplifier and the negative input terminal.

Figure 3:
FIG. 3 shows the waveform of the input voltage to the inductor-active capacitor filter of FIG. 2.

The input voltage waveform from the switching regulator 11 to the filter circuit is shown in FIG. 3 and the inductor current flowing at point A can be expressed as $I = I(AC) + I(DC)$. The resistors R, R5, R6 and R7 are all of equal value to make the DC value of the amplifier output voltage $V_a$ at point B equal to the DC value of the output voltage $V_o$ at point A. The amplifier output voltage $V_a$ is a function of the input voltage supplied by the feedback circuit to the positive input terminal and the gain of the stage, between points A and B, which is controlled by the equal biasing resistors R, R5, R6, R7 and the R1, C1 circuit. The value of resistor R1 is much smaller than the value of the equal biasing resistors. The DC gain of the amplifier is unity whereas the AC gain is much higher. This may be expressed as follows:

$$\text{DC Gain} \simeq \frac{R5}{R+R5}\left(1+\frac{R6}{R7}\right) = 1$$

$$\text{AC Gain} \simeq \frac{R5}{R+R5}\left(1+\frac{R6}{R1}\right) = \frac{1}{2}\left(1+\frac{R6}{R1}\right)$$

This assumes an ideal operational amplifier wherein $I_1$ would be equal to zero and the gain of the amplifier is high. The power transistor T1 functions as a low impedance shunt circuit for AC current and it is normally biased up in a linear operating range.

The purpose of the active capacitor is to provide a filtering action wherein only DC current is allowed to flow through the load $R_L$ and the AC current flow is diverted through the transistor. The only portion of the DC current that is desired to flow in the transistor is a sufficient bias current. If the active capacitor were of infinite capacity, there will be no AC voltage across the load resistor since there will be no AC current flowing through the resistor.

In the operation of the circuit, assume that some AC current flows through the load $R_L$ establishing an AC voltage across the output $V_o$. This voltage is fed back through the resistor R to the positive input terminal of the amplifier 10. If we assume that at the frequency of the input voltage $V_{in}$ capacitor C1 is a short circuit, then, the gain of the amplifier stage is high and the voltage $V_a$ at point B is an amplified replica of the AC output voltage at point A. The voltage $V_a$ drives the transistor stage T1 hard such that the AC current that was flowing in the load resistor will now be diverted into the transistor instead. The active capacitor circuit is a negative feedback circuit and the larger the AC output, the harder the transistor is driven to reduce that voltage.

Figure 4:
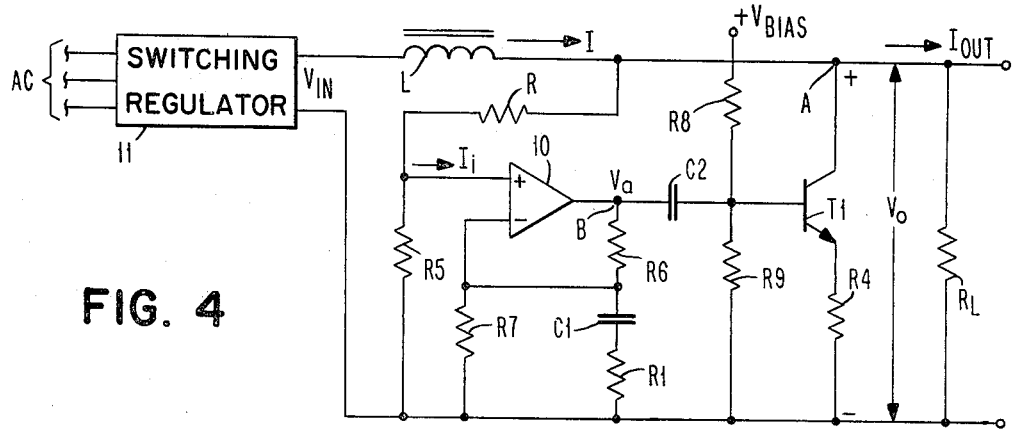
FIG. 4 shows the active capacitor circuit of FIG. 2 with a different bias arrangement for the shunt transistor T1.

The transistor T1 must be biased with a DC current so that it can operate on a bi-directional AC current. To accomplish this, the output DC voltage $V_o$(DC) at point A is fed back through the resistor R to the input of the amplifier. At DC the capacitor C1 is an open circuit and the amplifier stage has a gain of unity so that $V_a$(DC) = $V_o$(DC). The amplifier output voltage $V_a$(DC) is attenuated by the divider R2 and R3 to provide the bias voltage for transistor T1. The resistor R4 is selected to provide the desired bias current in the transistor. As shown in FIG. 4, another bias arrangement is possible where the shunt transistor T1 has its base electrode biased at DC by an external voltage source $+V_{BIAS}$ and the divider R8 and R9. An AC coupling means C2 would also be connected between the base electrode and the amplifier output. This embodiment has the advantage that the bias current of the transistor is not sensitive to the DC output voltage of the circuit.

Figure 5:
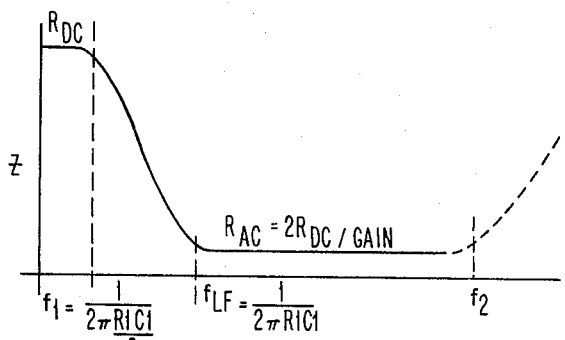
FIG. 5 is a graphical representation of impedance versus frequency for the active capacitor circuit of FIG. 2.
Figure 6:
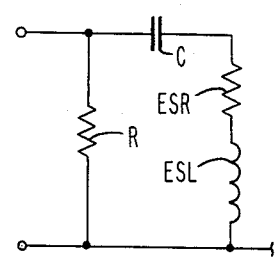
FIG. 6 shows the equivalent circuit of the active capacitor embodied in FIG. 2.

An impedance versus frequency plot of the active capacitor circuit of FIG. 2 is shown in FIG. 5 wherein $f_{LF}$ is the low frequency cut-in of the amplifier and $f_2$ is set by the bandwidth of the amplifier-transistor combination. This impedance plot can be recognized as lending itself to the equivalent circuit shown in FIG. 6.

Another significant function that the active capacitor must perform is to improve the response of the power supply to a change in load current. For example, if the power supply is driving a memory unit the call for a read or write operation will require that additional current be supplied. This change in load current can be envisioned as a sudden decrease in the load resistor $R_L$. As the load resistance decreased, the output voltage $V_o$ must start to decrease since the large inductance L will not allow for a sudden increase in output current. This sudden decrease in the output voltage is fed back through resistor R to the amplifier stage and the transient voltage is amplified at point B. This voltage feeds into the base of transistor T1 and tends to turn it off thereby diverting the transistor bias current into the load $R_L$ until the inductor L can increase its current enough to allow for the increased load current. In order to perform this function, transistor T1 must be biased up with at least the amount of current change that is expected. The circuit can be thought of as being a current reservoir of sudden current change demands. The variation in the output voltage caused by this current change is a function of the gain of the active capacitor.

Figure 7:
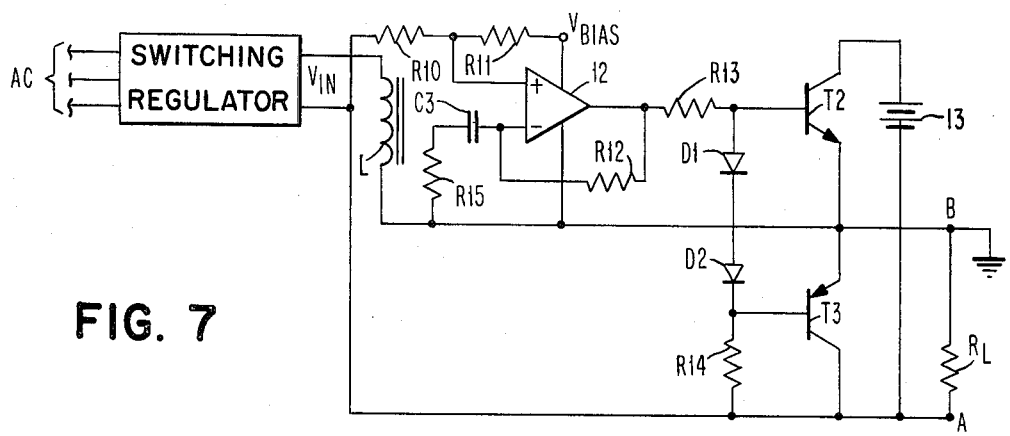
FIG. 7 is a schematic diagram of another embodiment of the active capacitor circuit wherein a pushpull power stage is employed.

In another embodiment, which is shown in FIG. 7, use is made of a push-pull power stage capable of serving as a current source or a current sink and connected across the output of the power supply. A complementary transistor pair forms a preferred configuration but many other push-pull connections are possible. A suitable amplifier configuration is used which senses an AC signal across the load, amplifies it, and drives the push-pull power stage in such a way as to suppress the AC signal.

In the example shown in FIG. 7, the amplifier 12 is shown referenced to ground and is provided with the biasing network comprising resistors R10, R11, R12, R15 and the capacitor C3. Similar to the amplifiers in the other embodiments described, amplifier 12 is a voltage follower for DC and is set for a high AC gain. The push-pull power stage comprises the complementary transistors T2 and T3 connected across the power supply output lines and the battery 13. Resistors R13, R14 and diodes D1, D2 bias the transistors in their linear operating range. With no signal across the load, transistors T2 and T3 are turned off. Upon the presence of a positive AC voltage signal across the load at point A, the signal is fed by way of resistor R10 to the positive input terminal of amplifier 12. The positive output from the amplifier will turn transistor T2 on while transistor T3 remains biased off. The positive voltage swing at point A resulted in a voltage drop at ground point B and transistor T2 now feeds current through the load $R_L$ to raise the voltage at ground and thus lower the voltage at point A to suppress the AC signal.

A negative AC voltage signal across the load at point A is similarly fed to the positive input terminal of the amplifier. The negative output from the amplifier now results in transistor T2 being turned off and transistor T3 turned on. Transistor T3 now draws current through the load $R_L$ to raise the voltage at point A and lower the voltage at ground point B to suppress the AC signal.

The advantage of the push-pull connection is that no power is wasted in biasing the active capacitor power stage.

In the preferred embodiments shown and described the phase control power supply provides the power to the load and regulates the load voltage and the active circuit works as a capacitor filter for the phase control power supply. This is only one potential use of the inventive concept of the active capacitor. It has uses in any power supply as a filter capacitor and can also be used in logic and memory circuits as a decoupling capacitor.

While the invention has been particularly shown and described with reference to preferred embodiments thereof, it will be understood by those skilled in the art that various changes in form and details may be made therein without departing from the spirit and scope of the invention.

What is claimed is:

1. In a phase control power supply which provides power to a load and regulates the load voltage, an active filter capacitor comprising:
    a transistor having emitter, base and collector electrodes with the emitter and collector electrodes connected across the output of said power supply;
    an amplifier having its output connected to the base electrode of said transistor;
    a feedback circuit for feeding the power supply output voltage back to the input of said amplifier;
    biasing resistor and AC coupling means connected to said amplifier for setting the DC gain of the amplifier low and the AC gain high; and
    means effective upon the feedback of output DC voltage to said amplifier for biasing said transistor with a DC voltage and a DC current whereby said transistor is biased in a linear operating range and can operate on a bi-directional AC current;
    the feedback of output AC voltage to said amplifier being amplified to drive said transistor whereby AC current flowing in the load will be diverted through said transistor instead.

2. In a phase control power supply which provides power to a load and regulates the load voltage, an active filter capacitor comprising:
- a transistor having emitter, base and collector electrodes with the emitter and collector electrodes connected across the output of said power supply;
- an amplifier having its output connected to the base electrode of said transistor;
- a feedback circuit for feeding the power supply output voltage back to the input of said amplifier;
- biasing resistor and AC coupling means connected to said amplifier for setting the DC gain of the amplifier low and the AC gain high; and
- voltage divider means connected between the output of said amplifier and the base of said transistor and effective upon the feedback of output DC voltage to said amplifier to attenuate the output DC voltage of said amplifier to provide base voltage for said transistor;
- said transistor being normally biased up in a linear operating range and the feedback of output AC voltage to said amplifier being amplified to drive said transistor harder whereby AC current flowing in the load will be diverted through said transistor instead.

3. In a phase control power supply regulator which provides power to a load connected across the output of said supply and which regulates the load voltage, an active filter capacitor comprising:
- a transistor having emitter, base and collector electrodes with the collector connected to the positive output terminal of the supply and the emitter connected to the negative output terminal of the supply;
- an amplifier having an output terminal connected to the base of said transistor and having positive and negative input terminals;
- a first bias resistor connecting said positive output supply terminal with the positive input terminal of said amplifier and providing a feedback circuit for feeding the power supply output voltage back to the input of the amplifier;
- a second bias resistor connected between said negative output supply terminal and the positive input terminal of said amplifier;
- a third bias resistor connected between said negative output supply terminal and the negative input terminal of said amplifier;
- a fourth bias resistor and a capacitor connected in series between said negative output supply terminal and the negative input terminal of said amplifier; and
- a fifth bias resistor connected between said capacitor and the output terminal of said amplifier;
- said first, second, third and fifth bias resistors each having an equal value which is greater than the value of said fourth bias resistor whereby the DC voltage output of said amplifier will be equal to the output DC supply voltage and the AC voltage output of said amplifier will be an amplified replica of the output AC supply voltage, said amplified AC voltage being effective to drive said transistor whereby AC current flowing in the load will be diverted through the transistor instead.

4. A phase control power supply regulator circuit as defined in claim 3 and including means responsive to the DC output voltage of said amplifier for normally biasing said transistor up in a linear operating range.

5. In a phase control power supply having a regulator and a power inductor for providing power to a load connected across the output of said supply and which regulates the load voltage, an active filter capacitor comprising:
- a transistor having emitter, base and collector electrodes with the collector connected to the positive output terminal of the supply and the emitter connected to the negative output terminal of the supply;
- an amplifier having its output connected to the base electrode of said transistor;
- a feedback circuit for feeding the power supply output voltage back to the input of said amplifier;
- biasing resistor and AC coupling means connected to said amplifier for setting the DC gain of the amplifier low and the AC gain high;
- voltage divider means connected between the output of said amplifier and the base of said transistor and effective upon the feedback of output DC voltage to said amplifier to attenuate the output DC voltage of said amplifier to provide base voltage for said transistor; and
- a resistor connected to said emitter electrode to provide a desired bias current in said transistor;
- said transistor being normally biased up in a linear operating range whereby a sudden increase in load current will result in a voltage drop across the load which is fed back through said amplifier and applied to the base of the transistor tending to turn said transistor off and diverting the bias current of the transistor into the load until said power inductor can increase its current.

6. In a phase control power supply which provides power to a load and regulates the load voltage, an active filter capacitor comprising:
- a transistor having emitter, base and collector electrodes with the emitter and collector electrodes connected across the output of said power supply;
- an amplifier having its output connected to the base electrode of said transistor;
- a feedback circuit for feeding the power supply output voltage back to the input of said amplifier;
- biasing resistor and AC coupling means connected to said amplifier for setting the DC gain of the amplifier low and the AC gain high; and
- external bias voltage means connected to said base electrode for biasing said transistor with a DC voltage and a DC current whereby said transistor is biased in a linear operating range and can operate on a bi-directional AC current;
- the feedback of output AC voltage to said amplifier being amplified to drive said transistor whereby AC current flowing in the load will be diverted through said transistor instead.

7. In a phase control power supply which provides power to a load and regulates the load voltage, an active filter capacitor comprising:
- a transistor having emitter, base and collector electrodes with the emitter and collector electrodes connected across the output of said power supply;
- an amplifier having its output AC coupled to the base electrode of said transistor;
- a feedback circuit for feeding the power supply output voltage back to the input of said amplifier;
- biasing resistor and AC coupling means connected to said amplifier for setting the DC gain of the amplifier low and the AC gain high; and
- an external source of bias voltage and voltage divider means connecting said source with said base electrode to provide base voltage for said transistor;
- said transistor being normally biased up in a linear operating range and the feedback of output AC voltage to said amplifier being amplified to drive said transistor harder whereby AC current flowing in the load will be diverted through said transistor instead.

8. In a phase control power supply having a regulator and a power inductor for providing power to a load connected across the output of said supply and which regulates the load voltage, an active filter capacitor comprising:
- a transistor having emitter, base and collector electrodes with the collector connected to the positive output terminal of the supply and the emitter connected to the negative output terminal of the supply;
- an amplifier having its output AC coupled to the base electrode of said transistor;
- a feedback circuit for feeding the power supply output voltage back to the input of said amplifier;
- biasing resistor and AC coupling means connected to said amplifier for setting the DC gain of the amplifier low and the AC gain high;

an external source of bias voltage and voltage divider means connected to said base electrode to provide base voltage for said transistor; and a resistor connected to said emitter electrode to provide a desired bias current in said transistor;

said transistor being normally biased up in a linear operating range whereby a sudden increase in load current will result in a voltage drop across the load which is fed back through said amplifier and applied to the base of the transistor tending to turn said transistor off and diverting the bias current of the transistor into the load until said power inductor can increase its current.

9. In a phase control power supply regulator which provides power to a load connected across first and second output terminals of said supply and which regulates the load voltage, an active filter capacitor comprising:

first and second transistors having emitter, base and collector electrodes, said transistors being connected across said supply terminals with their emitter electrodes being connected to each other and to said first output terminal;

a ground connection to said first output terminal;

means for biasing said transistors in their linear operating range;

an amplifier referenced to said grounded terminal and having input terminals and an output terminal which is connected to the base electrode of said first transistor;

biasing resistor and AC coupling means connected to said amplifier for setting the DC gain of the amplifier low and the AC gain high; and a feedback circuit between said second output terminal of said supply and an input terminal of said amplifier whereby a positive AC voltage swing at said second output terminal will be amplified to render said first transistor conductive to feed current to said grounded output terminal and load to suppress said positive AC swing, and a negative AC voltage swing at said second output terminal will be amplified to render said first transistor nonconductive and said second transistor conductive to draw current to said second output terminal and load to suppress said negative AC swing.

* * * * *